United States Patent [19]

Nilssen

[11] Patent Number: 4,745,539

[45] Date of Patent: May 17, 1988

[54] CONTROLLABLE FREQUENCY CONVERTER

[76] Inventor: Ole K. Nilssen, Caesar Dr., Barrington Hills, Ill. 60010

[21] Appl. No.: 9,822

[22] Filed: Feb. 2, 1987

[51] Int. Cl.[4] ............................................. H02M 5/45
[52] U.S. Cl. .......................................... 363/37; 363/98
[58] Field of Search ...................... 363/37, 98, 132, 41

[56] References Cited

U.S. PATENT DOCUMENTS

| | | | |
|---|---|---|---|
| 4,504,899 | 3/1985 | Jessee | 363/41 X |
| 4,520,437 | 5/1985 | Boettcher, Jr. et al. | 363/98 X |
| 4,525,774 | 6/1985 | Kino et al. | 363/37 X |
| 4,533,986 | 8/1985 | Jones | 363/98 X |
| 4,555,750 | 11/1985 | Matsumara et al. | 363/37 |
| 4,635,177 | 1/1987 | Shekhawat et al. | 363/98 X |

Primary Examiner—Patrick R. Salce
Assistant Examiner—Marc S. Hoff

[57] ABSTRACT

A frequency, voltage and waveshape converter is placed between the power line and the power input terminals of a load means (such as a fluorescent lighting system wherein the fluorescent lamps are operated by way of ordinary magnetic ballasts designed to be powered on regular 60 Hz power line voltage). The converter is controllably operable to provide to the power input terminals of the load means an AC voltage of frequency, magnitude and/or waveshape different from those of the power line voltage, thereby to permit effective control of the current supplied to the load means. In case of the load means being a fluorescent lighting system, the frequency of the AC voltage is adjustable over the range of 50–500 Hz, thereby providing for a very wide range of light output control.

38 Claims, 3 Drawing Sheets

CONTROLLABLE FREQUENCY CONVERTER

BACKGROUND OF THE INVENTION

1. Field of Invention

The present invention relates to means operable to: (i) be interposed between the power line and the power input terminals of a load means, and (ii) control the frequency, magnitude and/or waveshape of the voltage provided to the power input terminals of the load means.

2. Elements of Prior Art

One way of controlling the RMS magnitude and the waveshape of the voltage provided to a load from a power line is represented by a so-called light dimmer; which light dimmer is based on the phase-control of a Triac. However, this type of magnitude and waveshape control has only limited applications; and is, for instance, not useful in connection with loads having a substantial inductive component, such as a fluorescent lighting fixture or an electric motor. Of course, a Triac-type light dimmer is not capable of providing for frequency control; nor is it capable of providing control of waveshape independent of the waveshape of the voltage on the power line.

Other, more flexible methods for controlling the magnitude and waveshape of the voltage provided to a load from an ordinary power line have been described; and some of these methods are indeed usable with inductive loads. One such method is described in U.S. Pat. No. 4,350,935 to Spira et al. However, in the arrangement of Spira et al., there is no provision for frequency control.

SUMMARY OF THE INVENTION

Objects of the Invention

An object of the present invention is that of providing an improved means for controlling the frequency, magnitude and/or waveshape of the voltage provided to a load means.

Another object is that of providing a means adapted to be interposed between an ordinary electric utility power line and a load means, and to permit control of the frequency, magnitude and/or waveshape of the voltage provided to the load means.

These as well as other objects, features and advantages of the present invention will become apparent from the following description and claims.

Brief Description

In its preferred embodiment, the present invention comprises a frequency, magnitude and waveshape converter placed between the power line and the power input terminals of a load means, such as a fluorescent lighting system wherein the fluorescent lamps are operated by way of ordinary magnetic ballasts designed to operate on regular power line voltage (ex: 120 Volt/60 Hz). The converter is controllably operable to provide to the power input terminals an AC voltage of frequency, magnitude and waveshape different from those of the power line voltage. In case of powering the above-described fluorescent lighting system: (i) the waveshape of the AC voltage is modified such as to cause each of the system's magnetic ballasts to provide lamp current of significantly improved crest-factor, thereby providing for increased lamp efficacy and life, as well as for improved lamp starting and arc current stability; (ii) the frequency of the AC voltage is adjustable over the range of 50–500 Hz, thereby providing for a very wide range of light output control; and (iii) the RMS magnitude of the AC voltage is made to increase slightly as function of frequency, thereby providing for correspondingly increased cathode heating as light output diminishes, thereby preventing shortening of lamp life when operating at low light output.

The frequency, magnitude and waveshape converter consists of two sub-systems: (i) a high power factor AC-to-DC converter connected with the power line and operative to provide at a DC output a DC voltage of substantially constant magnitude, and (ii) a controllable DC-to-AC converter connected with the DC output and operative to provide at an AC output an AC voltage of adjustably controllable frequency, magnitude and waveshape.

The AC-to-DC converter comprises rectifier means operative to provide unfiltered full-wave-rectified power line voltage to a half-bridge inverter, the 30 kHz amplitude-modulated squarewave voltage output of which is connected across a series-resonant L-C circuit.

The 30 kHz current available from across the tank-capacitor of the L-C circuit is rectified and applied to an energy-storing capacitor means, the output of which is a DC voltage of an adjustable but, once adjusted, substantially constant magnitude.

Due to the basic nature of the series-resonant L-C circuit, the energy-storing capacitor means will be charged with a current of instantaneous absolute magnitude roughly proportional to that of the inverter's squarewave output voltage. As a result, the current drawn from the power line by the AC-to-DC converter is drawn with a high power factor.

The DC-to-AC converter consists of a half-bridge inverter operative to be powered from the constant-magnitude DC voltage and to provide a squarewave output voltage of controllable frequency and symmetry (ON/OFF times). This squarewave output voltage is then fed through in inductor means and provided in the form of an AC output voltage to the power input terminals of the load means.

A comparator means is operative to compare the instantaneous waveform of the AC output voltage with that of a desired reference voltage, and to cause the half-bridge inverter to switch in such manner as to force the frequency, magnitude and waveshape of the AC output voltage to conform to the desired reference voltage.

As an overall result, the AC output voltage can be made to have substantially any desired frequency, magnitude and/or waveshape—without incurring any substantial power dissipation within the DC-to-AC converter.

DESCRIPTION OF THE PREFERRED EMBODIMENT

Details of Construction of the AC-to-DC Converter

Figure 1:
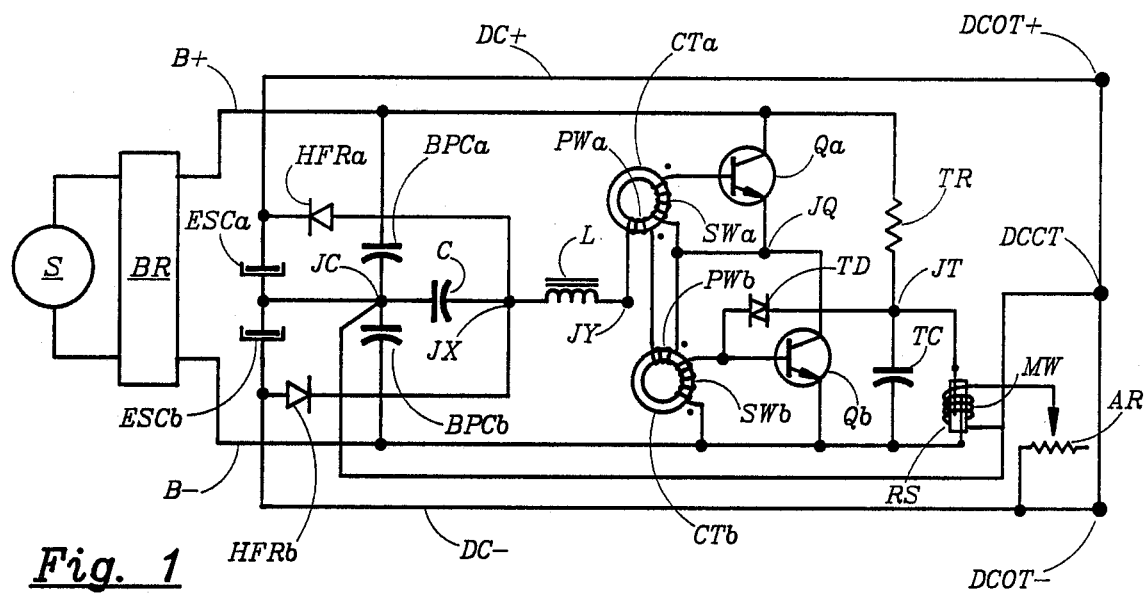
FIG. 1 schematically illustrates the AC-to-DC converter circuit operative to generate the adjustable constant-magnitude DC voltage used to power the DC-to-AC converter.

In the AC-to-DC converter of FIG. 1, a source S provides ordinary 120 Volt/60 Hz power line voltage to a bridge rectifier BR, the DC output of which is applied between a B+ bus and a B− bus, with the B+ bus being of positive polarity.

A first high-frequency bypass capacitor BPCa is connected between the B+ bus and a junction JC; and a second high-frequency bypass capacitor BPCb is connected between junction JC and the B− bus.

A first switching transistor Qa is connected with its collector to the B+ bus and with its emitter to a junction JQ; a second switching transistor Qb is connected with its collector to junction JQ and with its emitter to the B− bus.

A tank capacitor C is connected between junction JC and a junction JX; a tank inductor L is connected between junction JX and a junction JY; and primary windings PWa and PWb of positive feedback saturable current transformers CTa and CTb, respectively, are connected in series between junction JY and junction JQ.

Secondary winding SWa of transformer CTa is connected between the base and emitter of transistor Qa; secondary winding SWb of transformer CTb is connected between the base and the emitter of transistor Qb.

A first energy-storing capacitor ESCa is connected between junction JC and a positive DC bus DC+; and a second energy-storing capacitor ESCb is connected between junction JC and a negative DC bus DC−.

A first high frequency rectifier HFRa is connected with its anode to junction JX and with its cathode to the DC+ bus. A second high frequency rectifier is connected with its cathode to junction JX and with its anode to the DC− bus.

A trigger resistor TR is connected between the B+ bus and a junction JT; and a trigger capacitor TC is connected between junction JT and the B− bus. A trigger Diac TD is connected between junction JT and the base of transistor Qb.

The contactor terminals of a magnetic reed switch RS are connected across trigger capacitor TC, which is to say: between junction JT and the B− bus. Around the reed switch is placed a magnetizing winding MW, the terminals of which are connected in series with an adjustable resistor AR to form a series-combination, and this series-combination is connected between junction JC and the DC− bus.

The DC output voltage of the AC-to-DC converter of FIG. 1 is provided across DC output terminals DCOT+ and DCOT−; which DC output terminals are connected with the DC+ bus and the DC− bus, respectively.

An output DC center-tap DCCT is connected directly with junction JC.

Details of Operation of the AC-to-DC Converter

Figure 2:
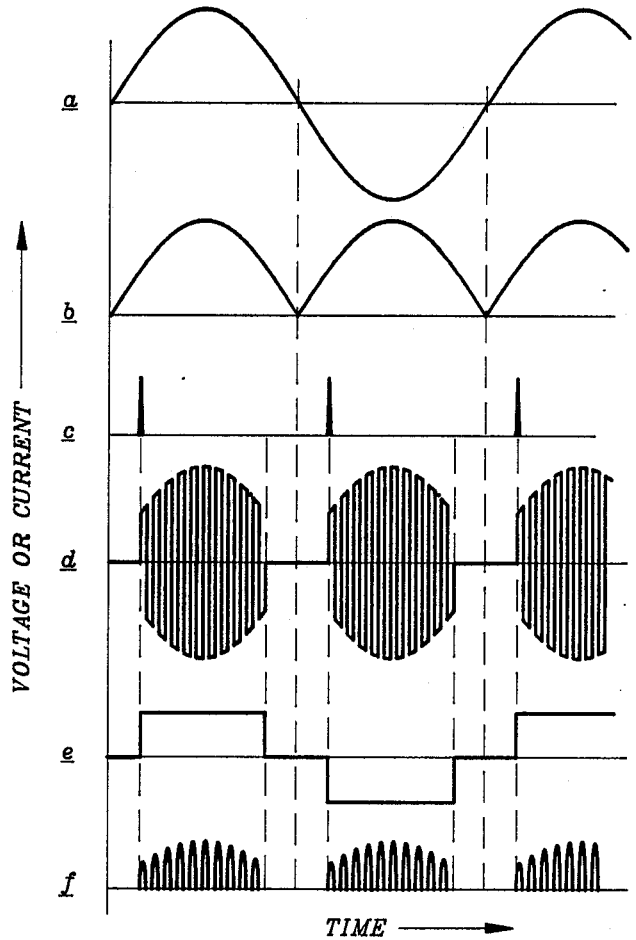
FIG. 2 illustrates various voltage and current waveforms associated with the circuit of FIG. 1.

The detailed operation of the AC-to-DC converter circuit of FIG. 1 may best be understood with reference to the various waveforms of FIG. 2, wherein:

FIG. 2a shows the waveform of the 120 Volt/60 Hz AC voltage provided from source S;

FIG. 2b shows the waveform of the full-wave-rectified 120 Volt/60 Hz AC voltage;

FIG. 2c shows the trigger pulses provided to the base of transistor Qb;

FIG. 2d shows the waveform of the high-frequency voltage provided between junctions JY and JC;

FIG. 2e shows the waveform of the current drawn from the 120 Volt/60 Hz AC voltage source S; and FIG. 2f shows the waveform of the charging current provided to one of the energy-storing capacitors ESCa/ESCb.

The circuit arrangement of FIG. 1 comprises a half-bridge inverter; which half-bridge inverter consists principally of the following components: bypass capacitors BPCa/BPCb, transistors Qa/Qb, and positive feedback current transformers CTa/CTb. The operation of such a self-oscillating half-bridge inverter is well known and is described in various ways in U.S. Pat. Nos. Re. 31,758, 4,506,318 and 4,581,562 to Nilssen.

The output of this half-bridge inverter is provided between junctions JC and JY and is illustrated in FIG. 2d as being an amplitude-modulated high-frequency voltage. Connected with the inverter's output, between junctions JC and JY, is a series-tuned L-C circuit consisting of tank inductor L and tank capacitor C. This series-tuned L-C circuit is series-resonant at or near the fundamental frequency (30 kHz) of the inverter's amplitude-modulated high-frequency output voltage.

As long as indeed provided, each of the trigger pulses of FIG. 2c occurs at a point approximately 30 degrees after the beginning of each sinusoidally-shaped DC supply voltage pulse of FIG. 2b. Since the inverter is arranged to cease oscillation whenever the instantaneous magnitude of its DC supply voltage falls below the level associated with a point just a little less than 30 degrees before the end of each sinusoidally-shaped DC supply voltage pulse, the resulting inverter output voltage will be as illustrated in FIG. 2d; which output voltage results in a current-draw from the AC voltage source (S) as illustrated in FIG. 2e and in a charging-current provided to energy-storing capacitors ESC-1/ESC2 as illustrated in FIG. 2f.

More particularly, being excited by the intermittent amplitude-modulated 30 kHz squarewave voltage of FIG. 2d, and being series-resonant at or near the 30 kHz fundamental frequency of this squarewave voltage, the voltage developed across the tank capacitor (C) will (by way of so-called Q-multiplication) increase in magnitude until it gets limited by loading; which means that it will increase to the point of providing substantial charging current to energy-storing capacitors ESCa and ESCb.

In turn, as long as the inverter operates to produce the output voltage indicated by FIG. 2d, the magnitude of the DC voltage developing across energy-storing capacitors ESCa and ESCb will increase until one or the other of the following events occurs:

(i) the current drain caused by DC load means DCLM equals the average charging current being provided from the inverter's output by way of the series-resonant L-C circuit;

(ii) the magnitude of the voltage across energy-storing capacitor ESCb gets to be so high as to cause enough current to pass through magnetizing winding MW to cause reed switch RS to close, thereby causing the inverter to stop operation.

Thus, as long as the AC-to-DC converter of FIG. 1 is loaded at or beyond a certain level, the magnitude of the DC output voltage (which exists between DC output terminals DCOT+ and DCOT−) is either at or below a certain predetermined magnitude (which is determined by the setting of adjustable resistor AR), and the inverter then operates in the intermittently continuous manner shown in FIG. 2d.

On the other hand, if the AC-to-DC converter is loaded below said certain level, the magnitude of the DC output voltage will gradually increase until it exceeds the predetermined level. At that point the reed switch closes and the inverter ceases operation, thereby ceasing altogether to provide output.

Thereafter, the magnitude of the DC output voltage will gradually decrease until the amount of current flowing through magnetizing winding MW gets to be so low as to cause reed switch RS to open, thereby to cause the inverter to start operating again, thereby to cause the magnitude of the DC output voltage to start increasing again.

In other words, when loaded to or beyond a certain point, the inverter in the AC-to-DC converter will continuously operate in the (120 Hz) interrupted manner indicated by FIG. 2d; whereas, when loaded below that certain point, the inverter will *interruptedly* operate in the interrupted manner indicated by FIG. 2d (i.e., it will operate in a doubly interrupted manner).

While the rate of interruption of the inverter's output voltage is a constant 120 Hz (see FIG. 2d), the rate at which this constant-rate 120 Hz interruption is interrupted depends on the degree of loading applied to DC output terminals DCOT+/DCOT− as well as the degree of hysteresis built into the magnetic reed switch: the smaller the degree of hysteresis, the higher the rate of interruption, and vice versa; the lower the loading, the lower the rate of interruption, and vice versa.

Details of Construction of the DC-to-AC Converter

Figure 3:
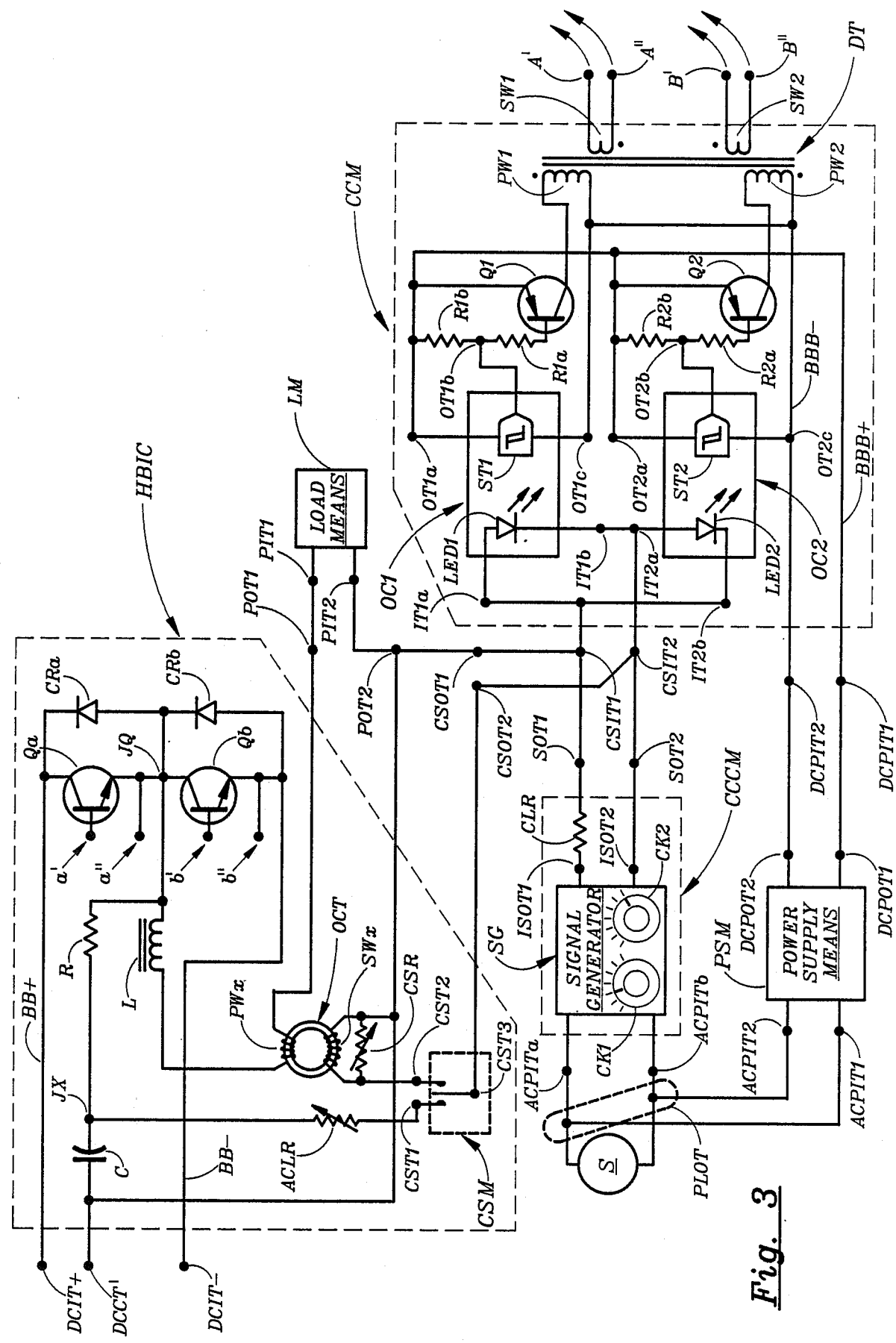
FIG. 3 schematically illustrates the DC-to-AC converter circuit operative to generate an output AC voltage of controllable frequency, magnitude and waveshape.

The DC-to-AC converter is illustrated in FIG. 3 and comprises four principal component parts: (i) a half-bridge inverter circuit HBIC, (ii) a comparator circuit means CCM, (iii) a controllable control current means CCCM, and (iv) a power supply means PSM.

Half-bridge inverter circuit HBIC has three DC power input terminals: DCIT+, DCIT− and DCCT'; it has two power output terminals POT1 and POT2, which are connected with power input terminals PIT1 and PIT2 of a load means LM; it has two control signal output terminals CSOT1 and CSOT2; and it has two pairs of drive input terminals a'/a" and b'/b".

Comparator circuit means CCM has two DC power input terminals DCPIT1 and DCPIT2; it has two control signal input terminals CSIT1 and CSIT2; and it has two pairs of drive output terminals A'/A" and B'/B".

Controllable control current means CCCM has two AC power input terminals ACPITa and ACPITb; and it has two signal output terminals SOT1 and SOT2.

Power supply means PSM has two AC power input terminals ACPIT1 and ACPIT2; and it has two DC power output terminals DCPOT1 and DCPOT2.

DC power input terminals DCIT+, DCIT− and DCCT' of half-bridge inverter circuit HBIC are respectively connected with DC output terminals DCOT+, DCOT− and DCCT of the AC-to-DC converter of FIG. 1. Power output terminals POT1 and POT2 are respectively connected with load input terminals PIT1 and PIT2. Control signal output terminals CSOT1 and CSOT2 are respectively connected with control signal input terminals CSIT1 and CSIT2 of comparator circuit means CCM. And drive input terminals a', a", b' and b" are respectively connected with drive output terminals A', A", B' and B".

DC power input terminals DCPIT1 and DCPIT2 of comparator circuit means CCM are respectively connected with DC power output terminals DCPOT1 and DCPOT2 of power supply means PSM. Control signal input terminals CSIT1 and CSIT2 are respectively connected with signal output terminals SOT1 and SOT2 of controllable control current means CCCM.

Controllable control current means CCCM is connected with its AC power input terminals ACPITa and ACPITb with power line output terminals PLOT of source S; and it is connected with its signal output terminals SOT1 and SOT2 to control signal input terminals CSIT1 and CSIT2, respectively, of comparator circuit means CCM.

Power supply means PSM is connected with its AC power input terminals ACPIT1 and ACPIT2 with power line output terminals PLOT of source S; and it is connected with its DC power output terminals DCPOT1 and DCPOT2, respectively, of comparator circuit means CCM.

In half-bridge inverter circuit HBIC, the DCIT+ terminal is connected with a BB+ bus and the DCIT− terminal is connected with a BB− bus.

In HBIC, a first transistor Qa is connected with its collector to the BB+ bus and with its emitter to a junction JQ; and a second transistor Qb is connected with its collector to junction JQ and with its emitter to the BB− bus. A first commutating rectifier CRa is connected with its cathode to the BB+ bus and with its anode to junction JQ; and a commutating rectifier CRb is connected with its cathode to junction JQ and with its anode to the BB− bus.

An inductor L is connected between junction JQ and power output terminal POT1 by way of primary winding PWx of output current transformer OCT. Power output terminal POT2 is connected directly with DC center-tap DCCT'.

A resistor R is connected between junction JQ and a junction JX; and a capacitor C is connected between junction JX and DC center-tap DCCT'.

A control switch means CSM has three control switch terminals CST1, CST2 and CST3.

An adjustable current-limiting resistor ACLR is connected between junction JX and first control switch terminal CST1.

Output current transformer OCT has a secondary winding SWx connected between power output terminal POT2 and second control switch terminal CST2. A current-shunting resistor CSR is connected between terminals POT2 and CST2.

DC center-tap DCCT' is connected with control signal output terminal CSOT1; and control switch terminal CST3 is connected with control signal output terminal CSOT2.

Comparator circuit means CCM comprises: (i) a first optocoupler OC1 having input terminals IT1a and IT1b, and output terminals OT1a, OT1b and OT1c; and (ii) a second opto-coupler having input terminals IT2a and IT2b, and output terminals OT2a, OT2b and OT2c.

The anode and cathode of a first light-emitting diode LED1 are connected with input terminal IT1a and IT1b, respectively; the anode and cathode of a second light-emitting diode LED2 are connected with input terminals IT2a and IT2b, respectively.

A first Schmitt trigger ST1 has a positive voltage terminal, a controlled output terminal, and a negative voltage terminal; which terminals are connected with output terminals OT1a, OT1b and OT1c, respectively. A second Schmitt trigger ST2 also has a positive voltage terminal, a controlled output terminal, and a negative voltage terminal; which terminals are connected with output terminals OT2a, OT2b and OT2c, respectively.

Input terminals IT1a and IT2b are connected together, and so are input terminals IT1b and IT2a as well. The IT1a/IT2b and the IT1b/IT2a terminals are connected with control signal input terminals CSIT1 and CSIT2, respectively.

Output terminal OT1a is connected with output terminal OT2a; which OT1a/OT2a terminals are jointly connected directly with a BBB+ bus. Output terminal OT1c is connected with output terminal OT2c; which OT1c/OT2c terminals are jointly connected directly with a BBB− bus. The BBB+ bus and the BBB− bus are connected with DC power input terminals DCPIT1 and DCPIT2, respectively.

A first PNP transistor Q1 is connected with its emitter to the BBB+ bus; the base of transistor Q1 is connected with output terminal OT1b of opto-coupler OC1 by way of a resistor output terminal OT1b of opto-coupler OC1 by way of a resistor R1a; and the collector of transistor Q1 is connected with the BBB− bus by way of a first primary winding PW1 of a drive transformer DT. A resistor R1b is connected between output terminals OT1a and OT1b.

A second PNP transistor Q2 is connected with its emitter to the BBB+ bus; the base of transistor Q2 is connected with output terminal OT2b of opto-coupler OC2 by way of a resistor R2a; and the collector of transistor Q2 is connected with the BBB− bus by way of a second primary winding PW2 of drive transformer DT. A resistor R2b is connected between output terminals OT2a and OT2b.

A first secondary winding SW1 of drive transformer DT is connected between drive output terminals A′ and A″; and a second secondary winding SW2 of drive transformer DT is connected between drive output terminals B′ and B″.

Controllable control current means CCCM comprises a signal generator SG that is connected between AC power input terminals ACPITa/ACPITb and intermediary signal output terminals ISOT1 and ISOT2. Signal generator SG provides an AC signal voltage across terminals ISOT1 and ISOT2, and it has: (i) a first control knob CK1 operative to permit adjustment of the frequency of the AC signal voltage, and (ii) a second control knob CK2 operative to permit adjustment of the waveform of the AC signal voltage.

Intermediary signal output terminal ISOT1 is connected with signal output terminal SOT1 by way of a current-limiting resistor CLR; and intermediary signal output terminal ISOT2 is connected with signal output terminal SOT2.

Power supply means PSM is connected between AC power input terminals ACPIT1/ACPIT2 and DC power output terminals DCPOT1/DCPOT2; and provides a DC voltage therebetween terminals DCPOT1 and DCPOT2, with terminal DCPOT1 being of positive polarity.

Details of Operation of the DC-to-AC Converter

Figure 4:
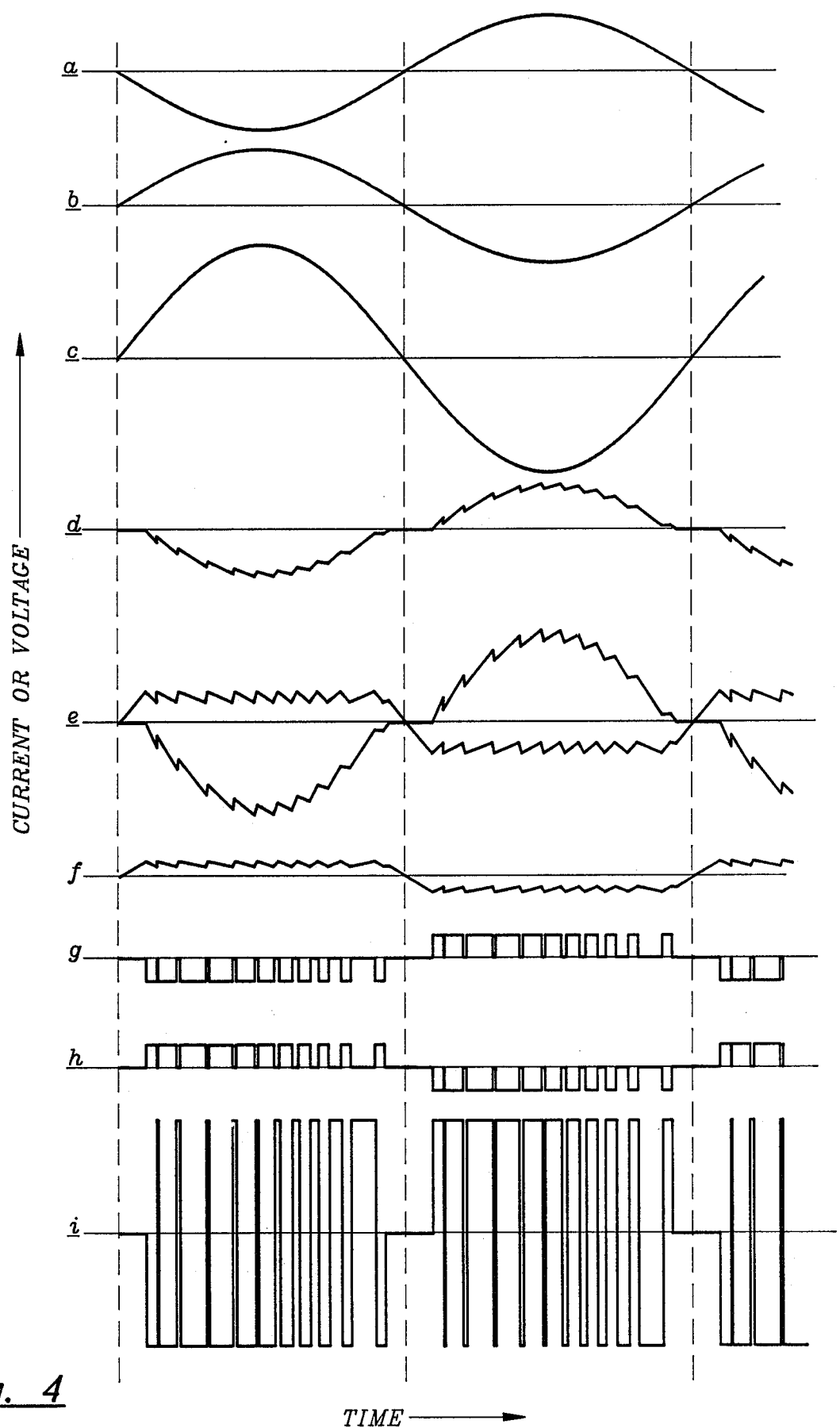
FIG. 4 illustrates various voltage and current waveforms associated with the circuit of FIG. 3.

The detailed operation of the DC-to-AC converter circuit of FIG. 3 may best be understood with reference to the various voltage and current waveforms of FIG. 4, wherein:

FIG. 4a shows the waveform of the AC output voltage desired across power output terminals POT1/POT2;

FIG. 4b shows the waveform of the reference AC signal voltage provided at intermediary signal output terminal ISOT1 as referenced to terminals ISOT2/SOT2/DCCT′/POT2, which four terminals are all at the same electrical potential since they are all connected together;

FIG. 4c shows the waveform of the current provided from signal output terminal SOT1 to terminal CSIT1 in response to the reference AC signal voltage, which current is hereinafter sometimes referred to as the reference current;

FIG. 4d shows the waveform of the voltage developed at junction JX; which voltage is approximately equal to the voltage provided at power output terminal POT1 as referenced to terminals ISOT2/SOT2/DCCT′/POT2.

FIG. 4e shows the waveform of the current flowing into control terminal CSIT1 in response to the AC voltage present at junction JX, which current is hereinafter sometimes referred to as the response current;

FIG. 4f shows the net current flowing into control terminal CSIT1, which net current is the sum of the currents depicted in FIGS. 4c and 4e;

FIG. 4g shows the waveform of the voltage provided at drive input terminal a′ as referenced to drive input terminal a″;

FIG. 4h shows the waveform of the voltage provided at drive input terminal b′ as referenced to drive input terminal b″; and FIG. 4i shows the waveform of the corresponding squarewave voltage provided at junction JQ, also as referenced to terminals ISOT2/SOT2/DCCT′/POT2;

In the DC-to-AC converter of FIG. 3, the half-bridge inverter circuit HBIC simply operates in such manner as to alternatingly connect junction JQ with the BB+ bus and the BB−bus, with the particular connection being determined by the nature of the drive voltages provided to the bases of transistors Qa and Qb. In turn, these drive voltages are determined by action of comparator circuit means CCM in response to the current being fed through its control terminals CSIT1/CSIT2.

In particular and by way of illustration, a positive current fed into control terminal CSIT1 causes light-emitting diode LED1 to emit light, thereby activating Schmitt trigger ST1. With Schmitt trigger ST1 activated, transistor Q1 is caused to conduct, thereby placing a DC voltage across primary winding PW1 of drive transformer DT—with the positive polarity of this DC voltage being at the collector of transistor Q1. In turn, this DC voltage will appear across secondary windings SW1 and SW2 of drive transformer DT, thereby causing a positive base voltage on transistor Qb and a negative base voltage on transistor Qa.

In other words, with a positive current flowing into terminal CSIT1 of comparator circuit means CCM, transistor Qb is caused to conduct. Correspondingly, with a positive current flowing into terminal CSIT2, transistor Qa is caused to conduct.

In overall operation, the DC-to-AC converter of FIG. 3 operates as follows.

The frequency and the waveshape of the AC output voltage desired to be provided across power output terminals POT1/POT2 is selected by way of control knobs CK1 and CK2 on signal generator SG. The magnitude of the desired AC output voltage is selected by way of adjustable current-limiting resistor ACLR of inverter circuit HBIC.

In the particular case illustrated by FIG. 4, the chosen AC output voltage of FIG. 4a has a sinusoidal waveshape, a frequency of about 75 Hz, and a peak magnitude of about 212 Volt (which corresponds to an RMS magnitude of about 150 Volt); which results in the choice of an AC reference voltage like that depicted in FIG. 4b.

(To permit the output voltage to attain a peak magnitude of 212 Volt, it is necessary first to make certain that the magnitude of the DC supply voltage is adequately large. Hence, adjustable resistor AR of the AC-to-DC converter of FIG. 1 is adjusted such as to make the magnitude of the DC voltage developed across each of energy storing capacitors ESCa/ESCb equal to at least 212 Volt.)

The chosen AC reference voltage causes a proportional reference current to flow into control terminal CSIT1 of comparator CCM, as indicated by FIG. 4c. By way of comparator CCM, any substantial change in the magnitude of this reference current acts to cause one of the inverter's switching transistors Qa/Qb to become conductive, thereby to cause the voltage at power output terminal POT1 to change in such a direction as to provide to control terminal CSIT1 a change in the magnitude of the response current provided therefrom; which change will be of such direction as to subtract from the change in the magnitude of the reference current.

Thus, the action of comparator CCM is such as to force the waveshape of the response current to be substantially equal to that of the reference current; which means that the magnitude of the voltage at junction JX will be forced on an ongoing basis to conform to that of the AC reference voltage.

In response to the reference current of FIG. 4c, as a direct result of the actions of comparator CCM, the DC-to-AC converter of FIG. 3 will exhibit the voltages and currents depicted by the different waveforms of FIG. 4.

Additional Details of Operation and Comments (a) With respect to the AC/DC converter of FIG. 1, the basic nature of a series-excited parallel-loaded high-Q resonant L-C circuit, when excited by a voltage source, is that of essentially constituting a current source to its parallel-connected load. Moreover, the magnitude of the current provided to the parallel-connected load is substantially proportional to the magnitude of the voltage provided by the series-connected voltage source.

Moreover, when such an L-C circuit is parallel-loaded with a substantially constant-voltage load (such as in instant case), the loading provided by the L-C circuit to the series-connected voltage source is substantially equivalent to a constant-current load. In other words, a parallel-connected constant-magnitude-voltage load converts into a constant-magnitude-current load as seen from the viewpoint of a series-connected source.

(b) One result of the above-described basic nature of a high-Q series-excited parallel-loaded resonant L-C circuit is that the magnitude of the charging current provided to the energy-storing capacitors ESC1/ESC2 (see FIG. 2f) is roughly proportional to the magnitude of the inverter output voltage (see FIG. 2d), which in turn in proportional to the magnitude of the inverter's DC supply voltage (see FIG. 2b).

(c) Another result is that the magnitude of the current drawn by the half-bridge inverter from its DC voltage supply will be about proportional to the magnitude of the DC voltage present across the energy-storing capacitors.

(d) Yet another result is that the magnitude of the current drawn by the series-resonant L-C circuit when powering a constant-voltage parallel-connected load, is substantially constant.

Thus, since—for a given setting of the adjustable resistor (AR)—the magnitude of the voltage on the energy-storing capacitors is substantially constant, the magnitude of the current provided by the inverter into the series-tuned L-C circuit is approximately constant; which, in turn, means that the magnitude of the current drawn by the inverter from its DC supply voltage will be approximately constant—as indicated in FIG. 2e.

(e) By virtue of their basic nature, magnetic reed switches have hysteresis. Thus, the magnitude of the current through the magnetizing winding (MW) required for causing the reed switch (RS) to close is higher than the magnitude of the current required to cause it to open.

Within a wide range, the amount of hysteresis can be designed to be just about any degree required. In the preferred embodiment, the hysteresis is about 20%; which implies that the magnitude of the DC output voltage will be regulated to within about plus/minus 10%.

(f) By changing the setting of the adjustable resistor (AR), the magnitude of the DC output voltage can likewise be set.

In this connection, it is important to note that the magnitude of the DC output voltage can be set to virtually any level: higher or lower than the peak magnitude of the DC supply voltage, higher or lower than the peak magnitude of the inverter's output voltage, etc.

In instant case, to permit provision of the desired RMS magnitude for the voltage provided to the load means (LM), the magnitude of the DC output voltage is set to about 220 Volt.

(g) In the preferred embodiment, the half-bridge inverter of the AC/DC converter circuit of FIG. 1 is so arranged as to oscillate approximately only in the intervals between 30 and 120 degrees, as well as between 210 and 330 degrees, of the 120 Volt/60 Hz supply voltage. As a result, current is drawn from the source only during those intervals; the implication of which is to minimize the third harmonic content of the current drawn from the source, which feature is important in situations where power is provided by a single phase of a three-phase power distribution system—a situation that is frequently encountered in connection with powering fluorescent lighting systems.

(h) The current drawn from the power line by the circuit of FIG. 1 is illustrated by FIG. 2e in an idealized form, which would only occur if using perfect components, including an infinitely high Q of the L-C tuned circuit.

With such perfect components—as long as the conduction angle of the current approximately covers the indicated two thirds of the total period of the power line voltage (i.e., the middle 120 degrees out of each half-cycle)—the power factor of the power drawn from the power line would be about 85%.

However, in reality, the current waveshape will not have quite as flat a top as is shown in FIG. 2e. Rather, the waveshape will exhibit a slightly curved top—with a raised center. As a result, the power factor of the power actually drawn from the power line will be closer to about 90%.

(i) The peak positive magnitude of the net current provided to control terminal CSIT1 of comparator CCM (i.e., the peak positive magnitude of the waveshape of FIG. 4f) is essentially determined by the magnitude of the current required to activate opto-coupler OC1. For the particular opto-coupler used, namely a Motorola H11L1, the magnitude required for activation is about 1.00 milli-Amp. The current magnitude at which de-activation occurs is about 0.75 milli-Amp.

Similarly, the peak negative magnitude of the net current provided to control terminal CSIT1 of comparator CCM (i.e., the peak negative magnitude of the waveshape of FIG. 4f) is essentially determined by the corresponding characteristics of opto-coupler OC2; which in this case also is a Motorola H11L1.

To provide a fairly accurate construction of the desired AC output voltage, it is important that the peak magnitude of the reference current (FIG. 4c) be substantially larger than the magnitude of the current required to activate opto-couplers OC1/OC2. A suitable ratio between the peak magnitude of the reference current and the magnitude of the current required to activate the opto-couplers is about 10:1; although, for clarity of illustration, the ratio indicated by FIG. 4c and FIG. 4f is only about 4:1.

(j) By substituting a current-limiting capacitive reactance means for current-limiting resistor CLR, a situation results in which the magnitude of the desired AC output voltage will automatically increase as its frequency is increased. Such a feature is particularly valuable in situations where the load means (LM) is an induction motor; in which case a controlled frequency-proportional AC output voltage would be desired in order to permit effective motor speed control.

(k) By making control switch means CSM provide for terminal CST3 to be connected with terminal CST2 instead of terminal CST1, comparator CCM will automatically control the AC output voltage in such manner as to attain a desired current waveform; which current waveform will now conform with the waveform of the reference AC signal voltage provided from signal generator SG.

For instance, if the load means happens to be one or more ordinary fluorescent lighting fixtures, improved luminous efficacy results when making the AC signal voltage a squarewave, thereby forcing the current flowing into the lighting fixture(s) to assume a squarewave shape.

(1) The purpose of capacitor C is that of providing an integrating or averaging effect, thereby ensuring that the voltage across capacitor C constitutes an average of the voltage provided at junction JQ, with the averaging taking place over a period corresponding to the time-constant RC of the combination of resistor R and capacitor C. Thus, the RC time-constant should be small compared with the period of the AC output voltage of the highest desired frequency.

(m) The purpose of inductor L is also that of providing an integration or averaging effect. The inductance of L should be such that the time-constant of L in combination with load means LM is short in comparison with the period of the AC output voltage of the highest desired frequency. That way, the desired AC output voltage can be constructed with a high degree of accuracy; yet, harmful EMI (or RFI) is minimized.

(n) Due to the presence of inductor L, commutating rectifiers CRa and CRb are manifestly required. They permit the inductive current of inductor L to continue to flow after one of the transistors (Qa or Qb) has been rendered non-conductive—without having to make the other transistor (Qb or Qa, respectively) conductive.

(o) Instead of using opto-couplers (OC1/OC2) as the principal components of comparator circuit means CCM, since electrical isolation is already provided-for in the form of drive transformer DT, any number of other means may be used. For instance, it would be entirely feasible to use a high-gain differential amplifier in place of the two opto-couplers.

(p) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
    rectifier means connected with an ordinary electric utility power line and operative to provide a DC voltage at a set of DC terminals; and
    inverter means connected with the DC terminals and operative to provide an AC voltage at a set of AC terminals;
    the inverter means having: (i) semiconductor switch means switched ON and OFF in accordance with controllable ON and OFF periods, and (ii) control means operative to permit adjustment of the frequency and the magnitude of the AC voltage by way of controlling the ON and OFF periods, the ON and OFF periods each being substantially shorter than the fundamental period of the AC voltage, thereby to cause this fundamental period to span at least two ON periods and two OFF periods.

2. The arrangement of claim 1 wherein the rectifier means comprises:
    a rectifier connected with the power line and operative to provide across a pair of intermediary terminals a unidirectional voltage of instantaneous absolute magnitude approximately equal to that of the voltage on the power line;
    DC-to-DC converter means connected with the intermediary terminals and operative to provide a unidirectional current to an energy-storing capacitor means connected with the DC terminals, the DC voltage thereacross being of substantially constant magnitude.

3. The arrangement of claim 2 wherein any power drawn from the power line is drawn with a power factor of at least 85%.

4. The arrangement of claim 1 wherein the frequency of the AC voltage is adjustable over the range of approximately 6 Hz to 600 Hz.

5. The arrangement of claim 1 wherein: (i) the set of DC terminals comprises a center-tap, and (ii) inverter means comprises a half-bridge inverter.

6. The arrangement of claim 1 wherein the inverter means comprises adjustment means operative to permit adjustment of the waveshape of the AC voltage.

7. An arrangement comprising:
an AC-to-DC converter connected with the power line voltage of an ordinary electric utility power line and operative to provide a substantially constant-magnitude DC voltage at a set of DC terminals; and
a DC-to-AC converter connected with the DC terminals and operative to provide an AC voltage at a set of AC terminals;
the DC-to-AC converter having: (i) semiconductor switch means operative to switch ON and OFF in accordance with controllable ON and OFF periods, and (ii) control means operative to permit adjustment of the frequency and the waveshape of the AC voltage by way of controlling the ON and OFF periods, each of the ON and OFF periods being substantially shorter than the fundamental period of the AC voltage, thereby to cause this fundamental period to span at least two ON periods and two OFF periods.

8. The arrangement of claim 7 wherein the control means is additionally operative to permit adjustment of the frequency of the AC voltage.

9. The arrangement of claim 7 wherein the control means is additionally operative to permit adjustment of the magnitude of the AC voltage.

10. The arrangement of claim 7 wherein the AC-to-DC converter comprises inverter means.

11. An arrangement comprising: an AC-to-DC converter connected with the power line voltage of an ordinary electric utility power line and operative to provide a substantially constant-magnitude DC voltage at a set of DC terminals; and
a DC-to-AC converter connected with the DC terminals and operative to provide an AC voltage at a set of AC terminals;
the DC-to-AC converter comprising: (i) inverter means connected with the DC terminals and having semiconductor switch means operative to effect periods of connection and disconnection between the DC terminals and a set of inverter terminals, (ii) inductor means connected between the inverter output terminals and the AC terminals, and (iii) control means operative to permit adjustment of the frequency and the waveshape of the AC voltage by controlling the durations of the periods of connection and disconnection, each period of connection and disconnection being substantially shorter than half the fundamental period of the AC voltage.

12. The combination of:
AC-to-DC converter means connected with the power line voltage of an ordinary electric utility power line and operative to provide at a set of DC terminals a DC voltage of substantially constant magnitude; and
DC-to-AC converter means connected with the DC terminals and operative to provide an AC voltage at a pair of AC terminals;
the DC-to-AC converter means comprising:
inverter means connected with the DC terminals and operative to provide at a pair of intermediary terminals an intermediary voltage characterized by having: (i) a fundamental frequency component of frequency equal to that of the AC voltage, and (ii) periods of positive voltage as well as periods of negative voltage, the duration of each one of these periods being substantially smaller than half the period of the AC voltage; and
inductor means connected between the intermediary terminals and the AC terminals and operative: (i) to permit the relatively unimpeded flow of current at the fundamental frequency of the AC voltage, but (ii) to significantly impede the flow of currents at frequencies substantially higher than the fundamental frequency of the AC voltage.

13. The combination of claim 12 wherein the DC-to-AC converter means additionally comprises control means operative to permit adjustment of the waveshape of the AC voltage.

14. The combination of claim 12 wherein the DC-to-AC converter means additionally comprises control means operative to permit adjustment of the frequency of the AC voltage.

15. The combination of claim 12 wherein the AC-to-DC converter means comprises control means operative to permit adjustment of the magnitude of the DC voltage.

16. The combination of claim 12 wherein the AC-to-DC converter means is operative to draw power from the power line with a power factor of at least 85%.

17. The combination of claim 12 wherein the intermediary voltage is additionally characterized by oscillating between a first voltage of substantially constant magnitude and a second voltage of substantially constant magnitude.

18. The arrangement comprising:
a source of DC voltage;
switching means connected with the source of DC voltage and operative to provide at an intermediary output an intermediary voltage characterized by: (i) alternating between being of a first magnitude and being of a second magnitude, and (ii) having an average magnitude; the switching means having control means operative in response to a control signal to cause the intermediary voltage to alternate between being of the first magnitude and being of the second magnitude, thereby to control the average magnitude;
load means receptive of a load current;
inductor means connected in circuit between the intermediary output and the load means, the inductor means being operative to prevent the load current from changing magnitude abruptly, thereby to make the load current a function of the average magnitude of the intermediary voltage; and
sensor means connected in circuit with the load means and operative in response to the load current to provide the control signal, thereby to control the operation of the switching means in such manner as to cause the average magnitude of the intermediary voltage to be such as to cause the waveshape of the load current to conform to a predetermined waveshape.

19. The arrangement of claim 18 wherein the first magnitude is of polarity opposite that of the second magnitude.

20. The arrangement of claim 18 wherein the intermediary voltage comprises: (i) repeated periods of being of the first magnitude, (ii) repeated periods of being of the second magnitude, and (iii) a fundamental frequency component having a fundamental period that is substantially longer than any one of the repeated periods.

21. The arrangement of claim 18 wherein the absolute instantaneous magnitude of the intermediary voltage is substantially equal to that of the DC voltage.

22. The arrangement of claim 18 wherein the switching means comprises a half-bridge inverter.

23. The arrangement comprising:
a DC voltage source having a positive DC terminal and a negative DC terminal;
switching means connected in circuit between the DC terminals and a pair of intermediary terminals, the switching means: (i) being operative to connect at least one of the intermediary terminals alternatingly between the positive DC terminal and the negative DC terminal, thereby to produce an intermediary voltage at the intermediary terminals, the intermediary voltage having an average magnitude, and (ii) having control means operative in response to a control signal to determine which of the DC terminals be connected with said one of the intermediary terminals at any given moment in time;
load means connected with the intermediary terminals, the load means being substantively responsive only to the average magnitude of the intermediary voltage; and
signal means connected with the control means and operative to provide the control signal, thereby to cause the average magnitude to vary in accordance with a predetermined program.

24. The arrangement of claim 23 wherein the signal means comprises adjustment means operative to permit adjustment of the predetermined program.

25. The arrangement of claim 23 wherein the predetermined program causes the average magnitude to vary in a sinusoidal manner.

26. The arrangement of claim 23 wherein: (i) the average magnitude varies in accordance with a cyclical period, and (ii) said at least one of the intermediary terminals is connected with one of the DC terminals several times during each cyclical period.

27. The arrangement of claim 23 wherein: (i) the intermediate voltage has a fundamental frequency component, and (ii) the switching means is operative to connect said at least one of the intermediary terminals to at least one of the DC terminals with a frequency that is substantially higher than that of the fundamental frequency component.

28. An arrangement comprising:
AC-to-DC converter means operative to connect with an ordinary electric power line and to provide a DC voltage at a set of DC terminals;
DC-to-AC converter means connected with the DC terminals and operative to provide a pulse-width-modulated AC voltage at a set of AC terminals, the AC voltage having an average magnitude that varies alternatingly at a frequency much lower than the frequency of the AC voltage, the DC-to-AC converter means having first manual adjustment means operative to permit manual adjustment of the frequency with which the average magnitude of the AC voltage alternatingly varies;
output terminals connected with the AC terminals by way of low-pass filter means, thereby to provide across a load connected with the output terminals a voltage having an instantaneous magnitude proportional to the average magnitude of the AC voltage.

29. The arrangement of claim 28 additionally comprising second manual adjustment means operative to permit manual adjustment of the degree by which the average magnitude varies alternatingly.

30. The arrangement of claim 28 wherein the first manual adjustment means also provides for adjustment of the degree by which the average magnitude varies alternatingly.

31. The arrangement of claim 28 additionally comprising means operative to permit adjustment of the magnitude of the DC voltage.

32. The arrangement of claim 28 additionally comprising means operative to cause the AC-to-DC converter to draw power from the power line with a power factor in excess of 80%.

33. The arrangement of claim 28 wherein the first manual adjustment means is additionally operative to permit adjustment of the degree to which the average magnitude of the AC voltage alternatingly varies.

34. The arrangement of claim 33 comprising means operative to cause the degree by which the average magnitude of the AC voltage alternatingly varies to be approximately proportional to the frequency with which the average magnitude alternatingly varies.

35. The arrangement of claim 28 wherein the first manual adjustment means is operative to permit adjustment of the frequency with which the average magnitude and the AC voltage alternatingly varies from: (i) a frequency that is lower than that of the voltage on the power line, to (ii) a frequency that is higher than that of the voltage on the power line.

36. An arrangement comprising:
AC-to-DC converter means operative to connect with an ordinary electric power line and to provide a DC voltage at a set of DC terminals, the AC-to-DC converter means having means operative to permit control of the magnitude of the DC voltage;
DC-to-AC converter means connected with the DC terminals and operative to provide a pulse-width-modulated AC voltage at a set of AC terminals, the DC-to-AC converter means having control means operative to cause the AC voltage to have an average magnitude varying in proportion to the magnitude of a reference signal provided at a set of reference input terminals, and;
output terminals connected with the AC terminals by way of low-pass filter means, thereby to provide across a load connected with the output terminals a voltage having an instantaneous magnitude proportional to the average magnitude of the AC voltage.

37. The arrangement of claim 36 having means operative to permit the average magnitude to be varied at a frequency equal to or lower than that of the voltage on the power line.

38. The arrangement of claim 36 additionally comprising source for providing reference signals of different frequencies, magnitudes and waveshapes.

* * * * *